United States Patent [19]

Matsuyama et al.

[11] 4,324,576
[45] Apr. 13, 1982

[54] METHOD FOR PRODUCING OPTICAL GLASS

[75] Inventors: Iwao Matsuyama, Sagamihara; Kenzo Susa, Hinodemachi; Shin Satoh, Iruma; Tsuneo Suganuma, Tokorozawa, all of Japan

[73] Assignee: Hitachi, Ltd., Tokyo, Japan

[21] Appl. No.: 209,711

[22] Filed: Nov. 21, 1980

[30] Foreign Application Priority Data

| Dec. 21, 1979 [JP] | Japan | 54-150082 |
| Dec. 27, 1979 [JP] | Japan | 54-169335 |
| Jul. 15, 1980 [JP] | Japan | 55-95755 |
| Jul. 15, 1980 [JP] | Japan | 55-95758 |

[51] Int. Cl.³ .................. C03C 3/04; C03C 3/06
[52] U.S. Cl. ............................ 65/26; 65/3.11; 65/30.1; 65/134; 252/317; 501/12; 501/54; 501/63
[58] Field of Search ......... 65/2, 3.11, 26, 30.1, 65/134, 18; 501/54, 63, 12; 252/317

[56] References Cited

U.S. PATENT DOCUMENTS

| 3,479,206 | 11/1969 | Patterson | 65/26 |
| 3,597,252 | 8/1971 | Schröder | 65/17 |
| 3,607,197 | 9/1971 | Ballantine | 65/26 |
| 3,767,434 | 10/1973 | Thomas | 252/317 X |
| 4,013,436 | 3/1977 | Van Der Steen | 65/32 |
| 4,028,085 | 6/1977 | Thomas | 106/52 X |
| 4,030,938 | 6/1977 | Thomas | 65/134 X |
| 4,098,595 | 7/1978 | Lenz et al. | 65/17 |

FOREIGN PATENT DOCUMENTS 2645375 4/1978 Fed. Rep. of Germany ....... 65/3.11

OTHER PUBLICATIONS

Yogyo-Kyokai-Shi (Japan), vol. 85, #988, S86830064F, 1977, Kamiya et al.

Yogyo-Kyokai-Shi (Japan), vol. 86, #999, S91560072, Kamiya et al., 5-1977.

*Primary Examiner*—Robert L. Lindsay, Jr.
*Attorney, Agent, or Firm*—Birch, Stewart, Kolasch & Birch

[57] ABSTRACT

A method for producing optical glass, which comprises charging a mixed solution capable of forming a high-silica-content gel by hydrolysis reaction into a vessel, the inner wall face of which is composed of a material unwettable to the mixed solution, such as a fluorocarbon resin or silicone resin, causing gelation of the mixed solution in the vessel, drying the obtained gel, and heating and sintering the obtained dry gel. When electrodes are placed in the mixed solution at the gelation step and an electric voltage is applied, the time required for formation of the gel is shortened. Furthermore, at the gel-drying step, if the amount of materials evaporated from the gel is detected or the weight of the gel is measured, the detected amount of the evaporated materials or the change of the weight of the gel is fed back to a factor regulating the drying speed, such as the drying temperature to control the drying speed to an appropriate level.

20 Claims, 5 Drawing Figures

METHOD FOR PRODUCING OPTICAL GLASS

BACKGROUND OF THE INVENTION (1) Field of the Invention

The present invention relates to a method for producing optical glass by sintering a gel having a high silica content, which is obtained by hydrolyzing a metal alkoxide. More particularly, the present invention relates to a method for producing optical glass by forming a high-silica-content gel having a predetermined shape free of cracks and sintering this gel.

(2) Description of the Prior Art

As the method for producing glass by utilizing the hydrolysis reaction, there is known a method comprising hydrolyzing a silicon alkoxide or a mixture formed by adding an alkoxide of a desired additive element to a silicon alkoxide, to form a silica gel or additive element oxide-containing silica gel, and heating and sintering the gel at a temperature higher than about 1000° C. but lower than the melting point of the gel. This method is disclosed in, for example, M. Yamane et al., Journal of Materials Science, vol. 14 (1979), pages 607–611.

Recently, optical fibers have been used as various optical communication media. These optical fibers are prepared from high-silica-content glass (containing a dopant for adjustment of the refractive index according to need). As the method for preparing these optical fibers, there are known (i) a method in which the starting material is molten in a crucible and the melt is formed into fibers, (ii) a method in which a film of high-silica-content glass is formed on the inner wall of a quartz tube by the CVD method (chemical vapor deposition method) and the film is collapsed and drawn at a high temperature to obtain fibers, and (iii) a method in which glass soot is formed by the CVD method, the soot is piled up, the piled soot is sintered to form a mother rod composed of high-silica-content glass and the mother rod is drawn at a high temperature to obtain fibers.

However, these conventional methods are still insufficient and defective. For example, in the method (i), it is difficult to obtain glass having a high silica content, and since purification of the starting material is difficult and incorporation of contaminants from the crucible cannot be avoided, it is difficult to obtain optical fibers having a high purity. In the method (ii), high-efficiency mass production is impossible and multi-component glass (containing a considerable amount of Na) cannot be prepared. Moreover, since the thermal oxidation reaction is utilized, when P, Ge or B is used as the dopant element, the yield is low, and production equipment becomes expensive. The method (iii) is defective in the multi-component glass cannot be prepared, high-efficiency mass production is impossible and production equipment becomes expensive. Furthermore, according to any of the methods (i), (ii) and (iii), a glass body having a desired shape cannot be freely prepared. Moreover, since silicon oxide is formed through a high temperature treatment in the methods (ii) and (iii) or since glass should be sufficiently molten at a high temperature in the method (i), increase of the manufacturing cost cannot be avoided.

As a means for eliminating these disadvantages of the conventional methods for preparing optical fibers, a method has been proposed for preparing a mother rod for production of optical fibers, which comprises hydrolyzing a metal alkoxide (where Si and Ge are contained as the metal) and sintering the resulting high-silica-content gel. A patent application was filed for this method in Japan as Japanese Patent Application No. 3957/79, and corresponding applications were filed in U.S.A., Great Britain, West Germany, France, Netherland and Canada claiming the Convention priority based on the above Japanese application. All of these prior applications are still pending, and the above-mentioned method is not prior art to the present invention.

When a mother rod is drawn at a high temperature to form fibers as pointed out above, the mother rod should naturally have a predetermined shape. Since the mother rod obtained by sintering a high-silica-content gel is required to have a predetermined shape, it is required that the high-silica-content gel before sintering (dry gel described hereinafter) should have a predetermined shape free of defects such as cracks. Also in the case where the mother rod is applied to optical uses other than production of optical fibers, the mother rod is similarly required to have a predetermined shape and be free of defects such as cracks. According to the conventional methods, however, it is considerably difficult to produce stable high-silica-content gels (dry gels) having a predetermined shape free of cracks.

In the method for producing glass by hydrolyzing a silicon alkoxide such as $Si(OCH_3)_4$ or $Si(OC_2H_5)_4$ as the main starting material, optionally with an appropriate dopant, to form a high-silica-content gel, and treating the gel at an appropriate high temperature in an appropriate atmosphere to effect sintering and conversion of the gel to glass, it is one of the important requirements that a faultless high-silica-content gel having a desired shape should be stably obtained as the material to be sintered.

In the specification of the above-mentioned pending application (which is not prior art), it is taught that a mixed solution ordinarily obtained by adding water and alcohol to $Si(OCH_3)_4$ or the like (the mixed solution is converted to a sol with the lapse of time, but in the instant specification, also such sol is included in the mixed solution) is charged into a vessel and is hydrolyzed at an appropriate temperature in the range of from 10° to 120° C. to cause gelation, and the obtained gel is gradually dried at a temperature of 50° to 120° C. to remove a solution of $CH_3OH$ or the like formed as the reaction product at the hydrolysis and excessive $H_2O$ and obtain a dry gel. At this step, after the solution has fallen into the passive state, that is, the gell state, $CH_3OH$ and $H_2O$ contained in the interior of the gel is allowed to ooze out by a dehydrating condensation reaction or the like, and contraction of the gel is initiated and the gel separates from the wall of the vessel. Namely, the phenomenon called "syneresis" in the colloidal chemistry takes place. Cracks are readily formed at the time of this syneresis, rendering it difficult to obtain a dry gel having a desired shape.

In order to form a dry gel free of cracks, it is necessary to dry a gel at a predetermined drying speed at the above-mentioned drying step. According to the teaching of the specification of the above-mentioned pending application (which is not prior art), such drying speed can be attained if the weight reduction rate at the drying speed is less than 40%/day, preferably 10 to 20%/day, based on the weight of the gel in the initial stage of gelation. At the step of drying the gel, cracks (other than cracks formed at the time of syneresis) are formed if particles as structural units of the gel are not allowed to effect re-arrangement throughout the gel when solutions of H₂O and CH₃OH or the like in the interior of the gel are being removed. Accordingly, if the gel is gradually dried over a period sufficient to cause re-arrangement of the particles throughout the gel, a crack-free dry gel having a like figure to the vessel can be obtained. It is not easy to make such adjustment of the drying speed only by perception. Therefore, it often happens that at the step of drying the gel, the drying speed is partially deviated from the appropriate range and cracks are formed in the gel. Furthermore, even if cracks are not formed, this drying step is not preferred from the industrial viewpoint because an step is complicated and troublesome.

The following references are cited to show the state of the art:

(i) Japanese Patent Publication No. 6604/73
(ii) Japanese Patent Application Laid-Open Specification No. 137086/78
(iii) M. Yamane et al., Journal of Materials Science, vol. 13 (1978), pages 607–611

SUMMARY OF THE INVENTION

It is a primary object of the present invention to provide an improvement in the method for producing optical glass by sintering a high-silica-content gel obtained by hydrolysis of a metal alkoxide, in which formation of cracks in the high-silica-content gel is effectively prevented.

In accordance with the present invention, this and other objects can be attained by a method for producing optical glass, which comprises the steps of (i) charging a mixed solution capable of forming a high-silica-content gel by hydrolysis reaction into a vessel having a predetermined shape, at least the inner wall face of which is composed of a material unwettable to the mixed solution, (ii) causing gelation of the mixed solution in said vessel, (iii) gradually drying the gelled mixed solution (hereinafter referred to as "gel") to form a dry gel, and (iv) heating the dry gel to gradually elevate the temperature thereof and sintering the dry gel at a collapsing temperature (the temperature that converts a porous gel to a nonporous state) lower than the melting point of said dry gel.

In the above method, according to the present invention, the preparation procedures may be the same as in the conventional methods or the above-mentioned method of the prior pending application except that at least the inner wall face of the vessel in which the mixed solution is charged is composed of an unwettable material. Accordingly, process conditions described hereinafter, except the material of the vessel, are given only by way of example, and process conditions that can be adopted in the present invention are not limited to those described hereinafter.

We made careful and minute examinations on cracks formed on gels at the time of syneresis, and found that the wettability of the vessel, in which the mixed solution is charged, to the mixed solution has significant influences on formation of cracks on the gel at the time of syneresis. More specifically, when the vessel has a good wettability to the mixed solution, at the time of syneresis resulting from contraction of the gel, a stress is produced between the gel and the inner wall face of the vessel and cracks are readily formed on the gel because of this stress. On the other hand, when a vessel unwettable to the mixed solution is used, the gel easily separates from the inner wall face of the vessel and cracks are hardly formed on the gel.

Ordinarily, the solvent of the mixed solution may be regarded as an aqueous solution. As the material unwettable to the aqueous solution as the solvent, there can be mentioned a fluorocarbon resin, and it has been found that best results are obtained when a fluorocarbon resin is used in the present invention. As the fluorocarbon resin, there can be mentioned, for example, Teflon (trademark of polytetrafluoroethylene manufactured by Du Pont Co., U.S.A.). Fluorothene [trademark of $(CClCF_3)_n$ manufactured by Union Carbide and Carbon Corp., U.S.A.] and Polyfluoron [trademark of $(CClCF_3)_m$ in which m is larger than n above, manufactured by Acme Resin Corp., U.S.A.]. Teflon is especially preferably used in the present invention because it is easily available.

The intended effects of the present invention can be attained if a vessel in which the mixed solution is to be charged is formed of a fluorocarbon resin such as mentioned above. However, since only the inner wall face of the vessel is required to be unwettable as pointed out hereinbefore, a vessel formed of glass or the like may be used if the inner wall face is coated with an unwettable material such as a fluorocarbon resin. The use of a vessel having only the inner wall face coated with an unwettable material is preferred from an economical viewpoint, because the amount of expensive Teflon material or the like can be reduced.

When a silicone or the like is used as the unwettable material, since it is impossible to form the entire structure by such unwettable material, the inner face of the wall alone is coated with the unwettable material.

As a result of our research, it was found that a silicone resin is an unwettable material which comes next to a fluorocarbon resin and is suitable for carrying out the present invention. The fluorocarbon resin is ordinarily opaque and is disadvantageous in that when the fluorocarbon resin is used, the drying state of the gel in the vessel cannot be seen from the outside. On the other hand, when the inner wall face of a glass vessel is coated with a silicone resin, the drying state of the gel can be seen from the outside. Further, the silicone resin is ordinarily less expensive than the fluorocarbon resin and in this point, the silicone resin is advantageous over the fluorocarbon resin.

As the silicone that can be used in the present invention, there can be mentioned for example, a methyl silicone varnish and a phenylmethyl silicone varnish.

It is sufficient if the layer of the unwettable material formed on the inner wall face of the vessel is applied as a film onto the inner face of the vessel. The thickness of the film may be about 10 A. Of course, a film having a larger thickness may suffice.

The mixed solution capable of forming a high-silica-content gel by hydrolysis reaction is ordinarily formed by adding water and a polar organic solvent to a silicon alkoxide represented by the general formula $Si(OR)_4$ in which R stands for an alkyl group. At least one compound of an element of B, P, Ge, Zr, Ti and Al may be incorporated as a dopant into the mixed solution. The refractive index of the resulting glass can be adjusted by incorporation of the dopant. Silicon alkoxides $Si(OR)_4$ which are liquid at normal temperatures can be used in the present invention. Ordinarily, $Si(OCH_3)_4$ or $Si(OC_2H_5)_4$ is used. It is known that an acidic compound such as HCl can be added to the mixed solution as a catalyst promoting the gelation in the case where Si- $(OC_2H_5)_4$ is used. Also in the present invention, such catalyst may be used.

The polar organic solvent is added so as to produce a good miscible state in the mixed solution. An alkanol such as a monohydric alcohol which is liquid at room temperature may be used as the polar organic solvent. For example, there can be mentioned methanol, ethanol, propanol, isopropanol and butanol. Furthermore, there can be used other miscible solvents such as ketones and amides, for example, acetone, dioxane, dimethylformamide and mixtures thereof.

As the compound that can be used as the dopant for changing the refractive index of the resulting glass, there can be mentioned, for example $B(OCH_3)_3$, $B(OC_2H_5)_3$, $B(OC_3H_7)_3$, $PO(OCH_3)_3$, $PO(OC_2H_5)_3$, $PO(OC_3H_7)_3$, $Ge(OCH_3)_4$, $Ge(OC_2H_5)_4$, $Ge(OC_3H_7)_4$, $Ge(OC_4H_9)_4$, $Zr(OC_3H_7)_4$, $Zr(OC_4H_9)_4$, $Ti(OC_3H_7)_4$, $Ti(OC_4H_9)_4$, $Al(OC_4H_9)_3$, phosphoric acid and boric acid.

The vessel in which the mixed solution is to be charged should have an inner shape corresponding to the desired shape of the intended glass block and the vessel should have a dimension about 2.5 times as large as the dimension of the intended glass block. The reason is that since the dimension of the gel is reduced to about ½ during the drying step (iii) and the gel is further contracted during the heating and sintering step (iv), the dimension of the obtained glass corresponds to about 4/10 of the dimension of the gel before drying, that is, the dimensin of the vessel. However, from a practical viewpoint, it is difficult to fill the vessel fully with the mixed solution, and ordinarily, the vessel is filled with the mixed solution so that about 80% of the volume of the vessel is occupied by the mixed solution. Accordingly, the dimension of the vessel should be determined by taking into account this non-filled portion.

Gelation of the mixed solution at the step (ii) is carried out at a temperature of 10° to 120° C. as pointed out hereinbefore. At too high a temperature, cracks are readily formed on the gel. At too low a temperature, the gelation time becomes too long and also too low a gelation temperature is not preferred from an economical viewpoint. If a voltage of 1 to 200 V is applied from electrodes placed in the mixed solution, good effects of promoting gelation of the mixed solution and shortening the gelation time can be attained.

The operation of drying the gel in step (iii) to form a dry gel is ordinarily carried out at 50° to 120° C. The drying speed is adjusted so that the weight reduction rate is less than 40%/day, preferably 10 to 20%/day, based on the weight of the gel in the initial stage of gelation. Even if the drying speed is too low, the properties of the obtained dry gel are not adversely affected, but too low a drying speed is not preferred from an economical viewpoint. Too high a drying speed is not desired because cracks are formed on the gel.

As a means for controlling the speed of drying the gel within the above range and producing a large quantity of a gel having uniform properties at one time, we developed a method comprising detecting the amount of materials evaporated from the gel, feeding back the detected amount to a factor regulating the drying speed, and adjusting the drying speed to an appropriate level by controlling the amount of evaporation from the gel. When this method is applied to step (iii) of the present invention, the drying speed can easily be adjusted to an appropriate stable level.

The amount of evaporation from the gel can be detected by measuring the weight of the gel and tracing changes in the weight of the gel.

As means for drying the gel, there may be adopted a method in which a drying gas is introduced into the gel-filled vessel from one side of the vessel and the gas is discharged from the other side of the vessel. When this drying method is adopted, if the discharged gas is fed to a water-cooled condenser to condense the alcohol and steam contained in the gas, the evaporation amount can be found from the amount of the condensate.

As the drying speed-regulating factor to which the value of the evaporation amount is to be fed back, there can be mentioned the amount of the drying gas introduced into the vessel, the drying temperature and the degree of opening or closing of a solenoid-operated valve for discharging the evaporated materials (this valve is used when the drying gas is not used).

If this method for drying the gel while controlling the drying speed is applied to the method of the present invention, where the face of the inner wall of the vessel is composed of an unwettable material, especially good results are obtained. Incidentally, if this method is applied to the conventional methods such as described hereinbefore, considerable effects can be attained.

The heating and sintering operation at step (iv) can be carried out according to procedures adopted in the conventional methods or according to the teaching given in the specification of the above-mentioned pending prior application. In the specification of the pending prior application, it is taught that clean air may be used as the atmosphere in this step, but if oxygen or an oxygen-helium mixed gas containing at least 1% of oxygen is used as the atmosphere, good results can be obtained because release of organic materials left in the dry gel is facilitated. Furthermore, it is taught that good results are obtained if helium is used as the atmosphere during sintering. Furthermore, if a chlorine-containing atmosphere is used at a temperature of 700° to 1000° C. during the temperature-elevating period of this step, the OH content in the obtained glass can be reduced and good results can be obtained. In order to prevent formation of cracks on the dry gel, it is preferred that in the heating and sintering step (iv), the temperature-elevating rate be less than 300° C./hr at temperatures of up to 700° C. and less than 60° C./hr at temperatures higher than 700° C. The collapsing temperature is ordinarily higher than 1050° C. However, the collapsing temperature may be reduced to about 1000° C. depending on the properties of the dry gel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PRESENTLY PREFERRED EMBODIMENTS

Figure 1:
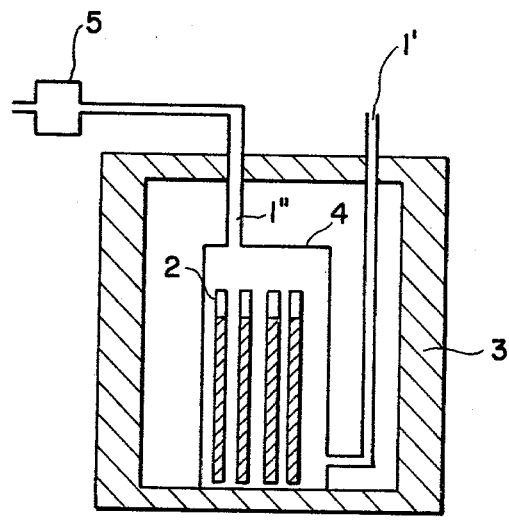
FIG. 1 is a schematic sectional view of a gel-drying device that is used in one embodiment of the present invention.

The present invention will now be described in detail with reference to the following Examples which should not be considered as limiting the scope of the invention.

EXAMPLE 1

A solution of 1 mole of a mixed alkoxide formed by adding 10 mole % of $Ge(OC_2H_5)_4$ to $Si(OCH_3)_4$ was diluted with 4 moles of $CH_3OH$, and the resulting solution containing 1 mole of the mixed alkoxide was mixed with 4 moles of $H_2O$ to form a mixed solution. The solution was transferred to a heat-resistant glass vessel having an inner diameter of 3 mm and a length of 200 mm. Incidentally, Teflon powder was applied to the inner wall face of the glass vessel and the vessel was heat-treated at 270° to 300° C., and this treatment was repeated several times to form a coating of Teflon fusion-bonded to the inner wall face of the vessel. For the experiment, 10 of the thus coated vessels were used, and 10 of the non-coated vessels were used as comparative vessels. Each of these vessels was charged with the above-mentioned mixed solution so that about 80% of the volume of the vessel was occupied by the mixed solution, and gelation was carried out in an oven maintained at 50° C. Completion of gelation was confirmed by detecting that the mixed solution lost the flowability and the content of the vessel did not flow even when the vessel was tilted, and the gelation time could easily be determined by preliminary experiments conducted under the same conditons. It was found that the gelation time was ordinarily 4 to 100 hours. In the same state, drying was carried out at 70° C. to cause syneresis. In one of the 10 Teflon-coated glass vessels, small quantities of cracks were formed in the bottom portion of the dry gel, but in the other 9 Teflon-coated vessels, syneresis was advanced without the formation of cracks. In all the glass vessels not treated with Teflon, sinosoidal cracks were formed in the gel from the bottom to the head of the vessel. It was found that good results were obtained if only Teflon was applied to the inner face of the vessel in the form a film having a thickness of about 10 A.

The drying operation was ordinarily carried out at 50° to 120° C. until a weight loss was no longer observed. The drying speed was adjusted so that the rate of the weight loss was less than 40 %/day, preferably 10 to 20 %/day. The temperature of the thus obtained dry gel was gradually elevated (lower than 300° C./hr at temperatures of up to 700° C. and lower than 60° C./hr at temperatures higher than 700° C.). The temperature was thus elevated to 1050° C. and this temperature was maintained for about 5 hours to effect sintering and to obtain an optical glass.

EXAMPLE 2

The same vessel as used in Example 1 was charged with a mixed solution of $Si(OCH_3)_4$ containing 10 mole % of $B(OC_2H_5)$ or $PO(OC_2H_5)_3$. The amounts of the added alcohol and water were the same as in Example 1, and the vessel was held in an oven maintained at 50° C. to effect gelation. The gel was dried at 70° C. to effect syneresis. In all the untreated vessels, cracks were similarly formed in the dry gel. On the other hand, in the Teflon-treated vessels, syneresis could be effected without the formation of cracks in a ratio of 70% in case of the B-added mixed solution and in a ratio of 90% in the case of the P-added mixed solution. A dry gel could be formed by carrying out the drying operation subsequently in the same manner as in Example 1. Then, the dry gel was heated and sintered in the same manner as in Example 1 to obtain optical glass.

EXAMPLE 3

A mixed solution having the same composition as that of the mixed solution used in Example 1 was transferred to a heat-resistant glass vessel having an inner diameter of 3 mm and a length of 200 mm. Incidentally, Pelgan Spray (tradename of a silicone-toluene mixture manufactured by Dow Corning Co.) was sprayed on the inner face of the wall of the glass vessel and toluene as the solvent was removed by drying to form a thin silicone film, and 10 of the so coated vessels were used. As comparative vessels, there were used 10 untreated glass vessels. Each of the vessels was charged with the mixed solution so that about 80% of the volume was occupied by the mixed solution, and gelation was carried out in an oven maintained at 50° C. In the same state, drying was carried out at 70° C. to effect syneresis. In one of the 10 silicon-coated vessels, formation of a small quantity of cracks was observed in the dry gel, but in the remaining 9 vessels, syneresis was advanced without the formation of cracks. On the other hand, in all of the 10 untreated vessels, sinosoidal cracks were formed from the bottom to the head. It was found that good results were obtained when the silicone was applied to the inner face of the vessel in the form of a film having a thickness of about 10 A.

A dry gel was prepared in the same manner as described in Example 1. The obtained dry gel was gradually heated at the same temperature-elevating rate as adopted in Example 1 and maintained at a high temperature in the same manner as in Example 1 to form optical glass.

It was found that air or helium containing at least 1% of oxygen was preferred as the atmosphere. It was also found that good results were obtained when oxygen or helium containing at least 1%, especially at least 5%, of chlorine was used as the atmosphere at the temperature-elevating step or when sintering was carried out in a helium atmosphere at a temperature higher than 1200° C. In this Example, the latter procedure was adopted.

EXAMPLE 4

The same vessel as used in Example 3 was charged with a mixed solution of $Si(OCH_3)_4$ containing 10 mole % of $B(OC_2H_5)_3$ or $PO(OC_2H_5)_3$. The amounts of the added alcohol and water were the same as in Example 3, and the vessel was held in an oven maintained at 50° C. to effect gelation. The gel was dried at 70° C. to effect syneresis. In all the untreated vessels, cracks were similarly formed in the dried gel. On the other hand, in the silicone-treated vessels, syneresis could be effected without formation of cracks in a ratio of 60% in case of the B-added mixed solution and in a ratio of 80% in case of the P-added mixed solution, and a dry gel could be formed by carrying out the drying operation subsequently in the same manner as in Example 3. Then, the dry gel was heated and sintered in the same manner as in Example 1 to obtain optical glass.

As will readily be understood from the results of the foregoing Examples, according to the present invention, formation of cracks can remarkably be reduced during the steps of gelling the mixed solution and forming the dry gel after synerysis.

The vessel which is treated with Teflon or silicone according to the present invention is not limited to a glass vessel, but as will be obvious to those skilled in the art, the intended effects can be attained even if the treatment is conducted to metal and plastic vessels on which the coating treatment is possible.

Furthermore, it will be readily understood that the shape of the vessel to be subjected to the coating treatment is not particularly critical and the present invention can be applied to any vessel irrespectively of the shape thereof. Moreover, the method of forming the fluorocarbon or silicone coating is not limited to those described in the foregoing Examples. Any of methods capable of forming coatings having a desired film can be adopted in the present invention.

EXAMPLE 5

We have invented the following device as a means for drying a gel at a desired drying speed.

More specifically, a vessel having a capacity for drying a large quantity of a gel at one time is arranged so that a drying gas represented by $N_2$ can be introduced into the vessel from a part thereof, a gas containing $CH_3OH$ or $H_2O$ isolated from the gel can be discharged from another part of the vessel, the temperature in the vessel can be freely changed and the drying speed can be detected. In this vessel, by an organic combination of these functions, drying can be accomplished at a predetermined constant speed.

Figure 2:
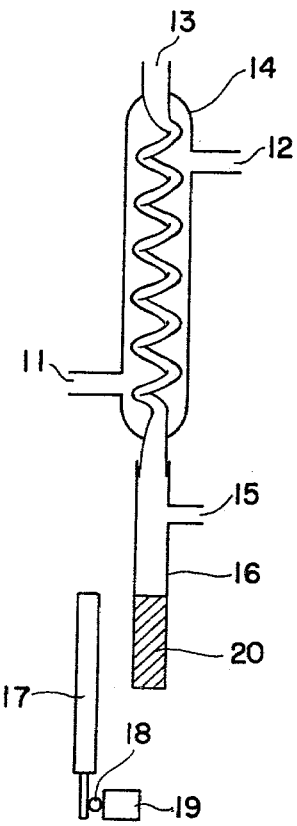
FIG. 2 is a diagram illustrating a water-cooled condenser that is used for controlling the drying speed in another embodiment of the present invention.

FIG. 1 is a schematic sectional view showing the above gel-drying device used in the present Example. Referring to FIG. 1, a predetermined vessel 4 is placed in a drier 3. This vessel 4 is arranged so that a drying gas is introduced into the vessel 4 from a part 1' and the gas is discharged from another part 1" of the vessel 4. The discharged gas is fed to a water-cooled condenser 5 where the alcohol and steam contained in the gas are condensed. This condenser 5 has a structure the same as that of a tube condenser customarily used for distillation or the like. More specifically, the condenser 5 has a structure shown in FIG. 2. Referring to FIG. 2, the gas containing the alcohol and water, which has been introduced from a gas inlet opening is cooled and liquefied by a condenser tube and the condensate is stored in a recipient 16. The dry gas is taken out from the condenser through a gas outlet opening.

A mixed solution containing $Si(OCH_3)_4$, $CH_3OH$ and $H_2O$ at a molar ratio of 1/4/4 was charged into twenty cylindrical vessels 2 having an inner diameter of 20 mm and a height of 250 mm. The inner wall face of each of the vessels was coated with Teflon in the same manner as described in Example 1, and these vessels 2 were placed in the device vessel 4 shown in FIG. 1. Gelation was carried out at 50° C. The weight of the gel was 1250 g. The drying temperature, in the range of from 50° to 150° C., and the gas flow rate, in the range of from 0 to 30 l/min were changed so that the rate of reduction of the weight of the gel by drying was 150 g/day. The feedback control was made on the temperature or the flow amount of the gas so that the weight of the level of the condensed liquid 20 stored in receptacle 16 shown in FIG. 2 was equal to the height of a reference moving guide plate 17. The speed of the guide plate 17 was adjusted in advance by a gear 18 and a motor 19 so that the liquid was stored at a rate of 150 g/day in the receptacle 16.

According to the above-mentioned method, a crack-free dry gel having a diameter of 12 mm and a length of 140 mm could easily be prepared. This dry gel was heated and sintered in the same manner as described in Example 1 to obtain optical glass.

In the above-mentioned method, if the speed of storage of the liquid in the receptacle was 500 g/day (40%/day) based on the initial weight of 1250 g, cracks were readily formed during the drying step and no intended dry gel was obtained.

When the above-mentioned speed was adjusted to 125 to 250 g/day, the intended dry gel was obtained. Even if the speed was lower than the above levels, the intended dry gel could also be obtained.

Incidentally, in FIG. 2, reference numerals 11 and 12 represent a cooling water inlet and a cooling water outlet.

EXAMPLE 6

Figure 3:
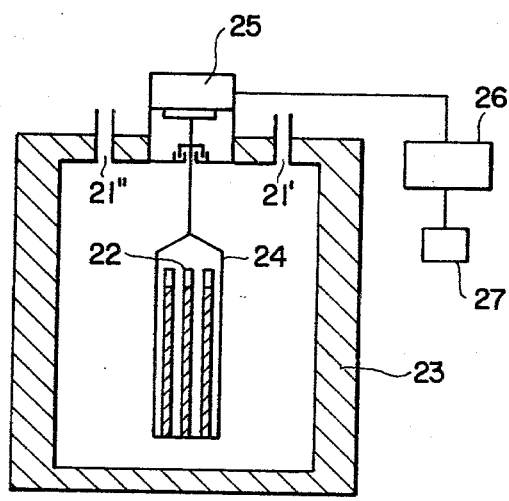
FIG. 3 is a diagram illustrating a gel-drying device provided with a drying speed-controlling device, that is used in still another embodiment of the present invention.

FIG. 3 is a diagram illustrating a gel-drying device used in the present Example. In Example 5, the method of detecting the amount of the condensate by using the condenser was adopted for detection of the amount of evaporation, but in the present Example, there was adopted a method in which the weight of the gel was measured and the amount of evaporation was detected based on changes of the weight of the gel.

The same mixed solution as used in Example 5 was gelled in a gelling vessel, and the weight of the gel was detected. An output of an electric signal based on this detection and a reference output generated from a reference signal generator 27 for generating an electric signal corresponding to the predetermined weight reduction rate are put in a signal generator 26 indicating a difference between the two outputs. By using a differential signal put out from this signal generator 26, the output of the heating source of a drier 23 was controlled so that the signal from the signal generator 26 became 0. More specifically, the feed amount of the gas and the temperature of the drier were increased or decreased according to the positive or negative potential of the differential signal put out from the signal generator 26, so that the differential signal became 0. In the present Example, both the feed amount of the gas and the temperature of the drier were controlled. However, in the present invention, the intended effects can be attained only by controlling one of them.

Thus, a dry gel similar to that obtained in Example 5 was obtained. When this dry gel was heated and sintered in the same manner as in Example 1, optical glass was obtained.

In Example 6, many gelling vessels were placed on the balance to determine the weight. Needless to say, the intended effects can similarly be attained even if one of the vessels was weighed and drying is carried out under feedback while other vessels are placed in the drier or gelling vessel where the same condition and state are produced.

In the foregoing description, the feedback control was made on the gas flow rate and the temperature by manual operation based on the visual observation. It will be apparent to those skilled in the art that electric means can be adopted for detection and control of the gas feed rate and the temperature control of the drier can be performed automatically.

As will readily be understood from the foregoing description, according to the present invention, a liquid-containing gel can be converted stably to a dry gel by controlling the drying speed of the gel while combining the gel-drying temperature and the feed and discharge amounts of the gas in an organic manner. Therefore, the manufacturing yield can be improved remarkably according to the present invention.

Incidentally, in FIG. 3, reference numerals 21', 21", 22 and 24 represent a gas introduction inlet, a gas discharge outlet, a gelling vessel and a vessel, respectively.

EXAMPLE 7

This Example illustrates an embodiment of the method of producing optical glass according to the pesent invention, in which at the step of drying the gel, a solenoid-operated valve mounted on a part of a gel-preparing vessel is opened and closed according to changes of the weight of the gel to control the amount of evaporation from the gel.

As in the preceding Examples, the dry gel obtained in this Example could be formed into optical glass by heating and sintering.

We found that the method in which the speed of drying the gel was detected in the form of the weight of the gel and the detection signal is fed back to a valve mounted on the gel-preparing vessel to control the amount of evaporation is very effectively utilized for stably preparing a dry gel.

Figure 4:
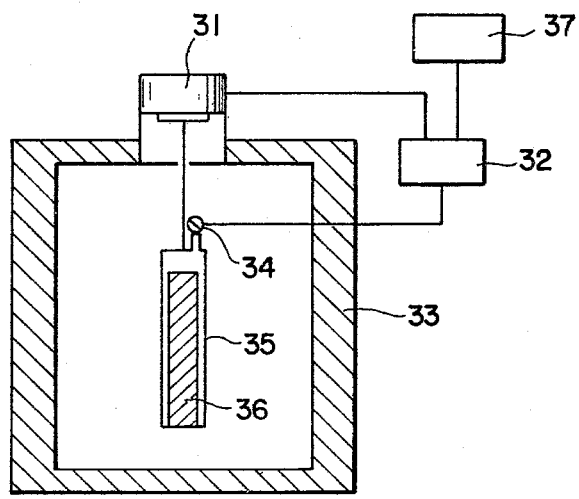
FIG. 4 is a diagram illustrating a gel-drying device provided with a drying speed-controlling device, that is used in a still further embodiment of the present invention.

FIG. 4 is a diagram illustrating a gel-drying device used in the present Example.

Referring to FIG. 4, a mixed solution containing $Si(OCH_3)_4$, $CH_3OH$ and $H_2O$ at a molar ratio of 1/4.5/4 was charged in a glass vessel 35 placed in an over 33, and the solution was maintained at 50° C. to effect gelation and form a pudding-like gel. The inner wall face, except the top wall face, of the glass vessel had been coated with Teflon in the same manner as described in Example 1. After occurrence of syneresis, a solenoid-operated valve 34 attached to the gelling glass vessel 35 was opened to remove $CH_3OH$ and $H_2O$ released from the gel. The total weight of the gel inclusive of the glass vessel 35 was measured by a balance 31. An electric signal generated on this detection and a reference signal generated from a programmed voltage generator 37 were put into a control device 32, and a differential signal obtained by comparison of the two electric signals was fed to as the control signal to the solenoid-operated valve 34 to open or close the valve 34.

The above operation was carried out according to the program set in the programmed voltage generator, whereby a dry gel could be obtained without the formation of cracks. The drying speed was adjusted so that the speed of reduction of the weight was 15%/day. According to these procedures, a crack-free dry gel having a diameter of 20 mm and a length of 400 mm could easily be prepared.

The thus prepared dry gel was heated and sintered in the same manner as in Example 1 to obtain optical glass.

In the foregoing description, the solenoid-operated valve for controlling the amount of evaporation was mounted on a part of the gel-preparing vessel. However, as will be obvious to those skilled in the art, the intended effects can similarly be attained even if many vessels are placed in an oven and the solenoid-operated valve is mounted on an appropriate portion of the oven.

As will be apparent from the foregoing illustration, according to the above embodiment of the present invention, a water-containing gel can be coverted stably to a dry gel, and the manufacturing yield can be improved remarkably.

When the above embodiment was carried out by using vessels having the inner wall face coated with Teflon or a silicon resin, very high effects can be obtained. If the drying speed-controlling method of the present embodiment was applied to the conventional method using an uncoated vessel, it was found that good effects were similarly obtained in connection with prevention of formation of cracks on the gel during the drying process after occurrence of syneresis.

EXAMPLE 8

This Example illustrates an embodiment of the method of producing optical glass according to the present invention, in which during the step of gelling the starting mixed solution, solution of the mixed solution and the subsequent gelation are promoted to shorten the gelation time, whereby incorporation of impurities from the atmosphere is prevented and the glass-producing speed is increased.

Figure 5:
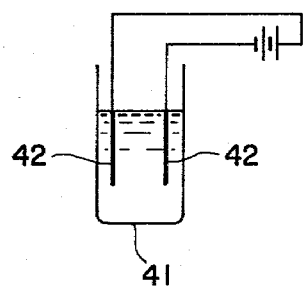
FIG. 5 is a diagram illustrating a device for promoting gelation of the mixed solution by applying a voltage to the mixed solution.

For attaining this effect, in this Example, gelation of the mixed solution is achieved from electrodes placed in the mixed solution. FIG. 5 is a diagram illustrating a gelation-promoting device used in this Example.

A mixture containing 15.2 g of $Si(OCH_3)_4$, 14.4 g of methanol and 7.2 g of distilled water was stirred and charged into a cylindrical glass having an inner diameter of 10 mm. The inner wall face of the cylindrical glass was coated with a silicone resin in the same manner as described in Example 1, and the vessel was placed in an oven maintained at 20° C. Laser beams were applied to the solution, and the state of solation was examined based on the scattering light from the mixed solution. It was found that when about 24 hours had passed from the point of preparation of the mixed solution, the quantity of the scattering light was increased and 48 hours were required for completion of gelation. On the other hand, when a direct current voltage of about 50 V was applied to the mixed solution prepared in the same manner as described above by using carbon electrodes 42, increase of the quantity of the scattering light immediately took place, and gelation was completed in about 20 hours.

The gelation-promoting effect was hardly influenced by the size of the electrode and the electrode spacing. Furthermore, the attained effect was not substantially changed whether an alternating current voltage or a direct current voltage was applied.

The gel prepared by natural standing after preparing the mixed solution and the gel prepared in a short time by application of the voltage were dried in the same manner as described in Example 1 and heated and sintered at about 1300° C. No disadvantage was brought about even in the case where the electric voltage was applied, and a glass rod having a diameter of about 4 mm was advantageously prepared.

Indeed, the gelation time can be shortened by elevating the temperature. However, in this case, cracks are readily formed at the time of syneresis from the glass vessel during the gelling process.

In order to prevent incorporation of impurities into the gel, it is preferred that an electrode material which has a high purity and has no bad influences on the optical characteristics, for example, the transmission loss, even if it is incorporated in the gel, such as carbon, aluminum or platinum, be used for the electrode. When an electrode coated with an insulating agent such as glass, Teflon or a silicone resin (that is, no electric current is caused to flow through the electrode) is used in the above embodiment, the gelation-promoting effect can be attained to some extent, but a higher effect can be obtained when an electric current is allowed to flow. If the applied voltage is higher than several volts, the intended effect can be attained, though the critical voltage differs to some extent according to the electrode arrangement.

The reason why gelation is promoted by application of an electric voltage has not been elucidated completely. However, it is believed that concentrations of $OH^-$ and $H^+$ ions have influences on the speed of the gelation reaction.

Obviously many modifications and variations of the present invention are possible in the light of the above teachings. It is therefore to be understood that within the scope of the appended claims the invention may be practiced otherwith than as specifically described.

What is claimed is:

1. A method for producing optical glass, which comprises the steps of,
   (i) charging a mixed solution capable of forming a high-silica-content gel by hydrolysis reaction into a vessel having a predetermined shape which is similar to the shape of the desired glass block to be produced, at least the inner surface of said vessel being provided with a material which is unwettable to the mixed solution said mixed solution containing a silicon alkoxide, water and a polar organic solvent, said silicon alkoxide being represented by the general formula $Si(OR)_4$ in which R is an alkyl group;
   (ii) causing gelation of the mixed solution in said vessel;
   (iii) gradually drying the gel thus obtained to form a dry gel, and
   (iv) heating the dry gel to gradually elevate the temperature thereof and sintering the dry gel at a collapsing temperature lower than the melting point of the dry gel, thereby forming a glass block of desired shape.

2. The method for producing optical glass according to claim 1, wherein the unwettable material is at least one member selected from the group consisting of fluorocarbon resins and silicone resins.

3. The method for producing optical glass according to claim 2, wherein the unwettable material is a fluorocarbon resin.

4. The method for producing optical glass according to claim 3, wherein the fluorocarbon resin is Teflon.

5. A method for producing optical glass according to claim 2, wherein the unwettable material is a silicone resin.

6. The method of producing optical glass according to claim 1, wherein, in the heating and sintering of the dry gel, the rate of elevating the temperature is less than 300° C./hr at temperatures of up to 700° C. and less than 60° C./hr at temperatures higher than 700° C.

7. The method for producing optical glass according to claim 1, wherein the mixed solution further contains as a dopant at least one compound containing B, P, Ge, Zr, Ti or Al.

8. The method for producing optical glass according to claim 1 or 7, wherein the mixed solution further contains an acidic compound.

9. The method for producing optical glass according to claim 1, wherein, in the step of gradually drying the gel, the amount of evaporated materials released from the gel is detected and the detected amount is fed back to a factor regulating the drying speed to control the amount of the materials evaporated from the gel.

10. The method for producing optical glass according to claim 9, wherein, in the step of gradually drying the gel, the change of the weight of the gel is detected, thereby determining the amount of the evaporated materials released from the gel.

11. The method for producing optical glass according to claim 9, wherein, in the step of gradually drying the gel, a drying gas is introduced into the gel-charged vessel from one side thereof and the gas is discharged from another side of the vessel, thereby drying the gel, and the discharged gas is introduced into a water-cooled condenser to condense some components in the gas and the amount of the evaporated materials released from the gel can be determined from the amount of the condensate.

12. The method for producing optical glass according to claims 9, 10 or 11, wherein the factor regulating the drying speed is the drying temperature.

13. The method for producing optical glass according to claims 9 or 10, wherein, in the step of gradually drying the gel, by opening a solenoid-operated valve mounted on the gel-charged vessel, the evaporated materials released from the gel are discharged from the vessel to dry the gel, and the factor regulating the drying speed is the degree of opening or closing of the solenoid-operated valve.

14. The method for producing optical glass according to claim 11, wherein the factor regulating the drying speed is the amount of the drying gas introduced into the vessel.

15. The method for producing optical glass according to claim 1, wherein at least two electrodes are placed in the mixed solution and a voltage of 1 to 200 V is applied between the electrodes, whereby promotion of the gelation and shortening of the gelation time is achieved.

16. The method for producing optical glass according to claim 1, wherein the drying speed is adjusted so that the weight reduction of the gel is less than 40%/day, based on the weight of the gel in the initial stage of gelation.

17. The method for producing optical glass according to claim 5, wherein the silicone resin is a member selected from the group consisting of a methyl silicone varnish and a phenylmethyl silicone varnish.

18. The method of producing optical glass according to claim 7, wherein said dopant is selected from the group consisting of $B(OCH_3)_3$, $B(CO_2H_5)_3$, $B(OC_3H_7)_3$, $PO(OCH_3)_3$, $PO(OC_2H_5)_3$, $PO(OC_3H_7)_3$, $Ge(OCH_3)_4$, $Ge(OC_2H_5)_4$, $Ge(OC_3H_7)_4$, $Ge(OC_4H_9)_4$, $Zr(OC_3H_7)_4$, $Zr(OC_4H_9)_4$, $Ti(OC_3H_7)_4$, $Ti(OC_4H_9)_4$, $Al(OC_4H_9)_3$, phosphoric acid and boric acid.

19. The method of producing optical glass according to claim 1, wherein gelation is carried out at a temperature of 10° to 120° C.

20. The method of producing optical glass according to claim 1, wherein the drying of the gel to form a dry gel is carried out at a temperature of 50° to 120° C.

* * * * *

UNITED STATES PATENT AND TRADEMARK OFFICE
CERTIFICATE OF CORRECTION

PATENT NO. : 4,324,576
DATED : April 13, 1982
INVENTOR(S) : Matsuyama et al

It is certified that error appears in the above—identified patent and that said Letters Patent is hereby corrected as shown below:

ON THE TITLE PAGE,

In the category entitled "[30] Foreign Application Priority Data", change

"Dec. 21, 1979 [JP] Japan .......... 54-150082"

to

--Nov. 21, 1979 [JP] Japan .......... 54-150082--

Signed and Sealed this

Sixth Day of July 1982

[SEAL]

Attest:

Attesting Officer

GERALD J. MOSSINGHOFF

Commissioner of Patents and Trademarks